United States Patent [19]
Kim

[11] Patent Number: 5,834,650
[45] Date of Patent: Nov. 10, 1998

[54] VIBRATION DETECTING SENSOR

[75] Inventor: Tae-ho Kim, Suwon, Rep. of Korea

[73] Assignee: Samsung Electronics Co., Ltd., Kyungki-do, Rep. of Korea

[21] Appl. No.: 731,171

[22] Filed: Oct. 10, 1996

[30] Foreign Application Priority Data

Mar. 7, 1996 [KR] Rep. of Korea ............... 1996-5945

[51] Int. Cl.⁶ ............................................ G01H 11/08
[52] U.S. Cl. ........................... 73/651; 310/329; 310/331; 73/514.34
[58] Field of Search ........................... 73/514.34, 497, 73/651, 654, 35.11, 35.13; 310/329, 331

[56] References Cited

U.S. PATENT DOCUMENTS

| | | | |
|---|---|---|---|
| 3,940,974 | 3/1976 | Taylor | 310/331 |
| 4,307,602 | 12/1981 | Sawada et al. | 73/35.11 |
| 5,063,782 | 11/1991 | Kellett | 73/514.34 |

*Primary Examiner*—John E. Chapman
*Attorney, Agent, or Firm*—Burns, Doane, Swecker & Mathis, LLP

[57] ABSTRACT

A vibration detecting sensor includes a pair of piezo-electric elements electrically connected together using a plate member, which eliminates the influences of temperature change to the surroundings by using a temperature compensating piezo-electric element, and prevents external noises from entering the device. Therefore, vibrations are detected efficiently.

8 Claims, 2 Drawing Sheets

VIBRATION DETECTING SENSOR

BACKGROUND OF THE INVENTION

The present invention relates to a vibration detecting sensor using piezo-electric elements, and more particularly to a vibration detecting sensor capable of eliminating the effects of temperature and noise.

Generally, a vibration detecting sensor is used in an electronic sphygmomanometer and also in machines for detecting vibrations.

FIGS. 1 through 3 show a conventional vibration detecting sensor comprised of a circular vibrating plate 1, a covering member 2 covering the circular vibrating plate 1, a piezo-electric element 3 attached to the center of the upper surface of the vibrating plate 1, and a lead-in wire 4 connected electrically to the piezo-electric element 3.

In the conventional vibration detecting sensor described above, the vibrating plate 1 is composed of a material such as a plastic or a rubber with metallic particles distributed therein. The piezo-electric element 3, composed of a complex plastic material such as rubber or a synthetic resin having ferroelectric particles such as PZT or $BaTiO_2$ distributed therein, is attached to the vibrating plate 1 by an adhesive. The covering member 2, composed of a metallic substance, includes a cylindrical wall 2a and a circular ceiling 2b on top of the wall 2a. At the bottom of the wall 2b, there is a channel-shaped flange 2c such that the vibration plate 1 snaps into the channel-shaped flange 2c and combines with the covering member 2. Also, a slot 2d is formed through the wall 2a above the channel-shaped flange 2c so that the lead-in wire 4 can be inserted within the covering member 2. The central wire end of the inserted lead-in wire 4 is soldered onto the upper surface of the piezo-electric element 3 by a soldering portion 5, and the shielding wire 4b of the lead-in wire 4 is connected to the wall 2a also by soldering.

When the vibrating plate 1 of the above-described conventional vibration detecting sensor is put into contact with a person near an arterial blood vessel or a machine to be detected, the vibrating plate 1 vibrates according to the pulse of the person or the vibration of the machine, and causes an electrical potential difference between the upper and lower surface of the piezo-electric element 3. Since the vibrating plate 1 electrically conducts through the metallic particles distributed therein, and the shielding wire 4b connected to the wall 2a of the covering member 2 is also connected electrically to the bottom side of the piezo-electric element 3, the electrical potential differences generated on the piezo-electric element 3 is output as an electric signal via the lead-in wire 4, and thus the vibrations can be detected.

However, because the above-described conventional vibration detection sensor uses a single-plate piezo-electric element, there are problems in that error signals are generated due to temperature changes of its surroundings. Also, because the lead-in wire 4 is inserted into the covering member 2 through the hole 2d on the wall 2a, external noises can penetrate through the hole 2d.

SUMMARY OF THE INVENTION

With a view to overcome or reduce the above problem, the object of the present invention is to provide a vibration detecting sensor with enhanced vibration detecting efficiency by eliminating the influence of temperature changes of the surroundings and preventing external noises from penetrating the covering member.

To achieve the above object, there is provided a vibration sensor comprising a vibrating case for housing a cantilevered structure supported on one end within the case by an isolating member. The cantilevered structure comprises a pair of piezo-electric elements having electrode layers which are electrically connected together using a plate member and electrically connected to an amplifier via a lead-in wire which passes through a covering member provided in the vibrating case.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
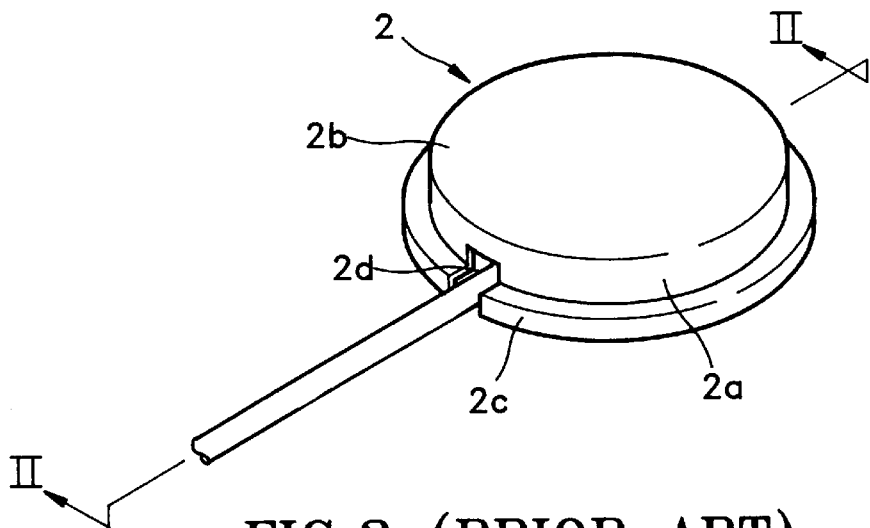
FIG. 1 is a perspective view schematically illustrating a conventional vibration detecting sensor.
Figure 2:
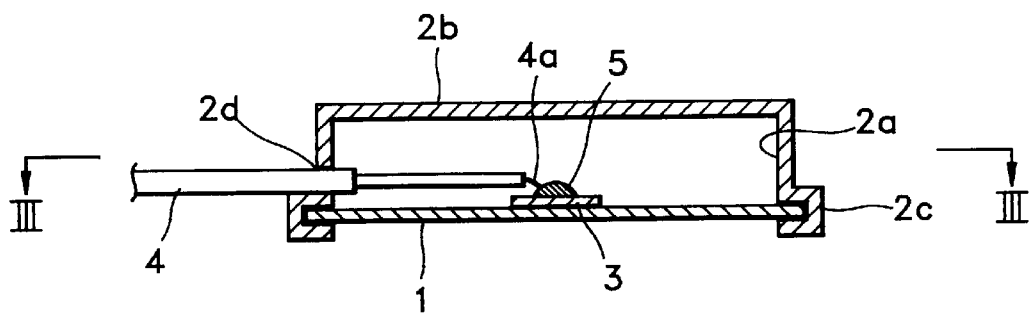
FIG. 2 is a sectional view of the sensor in FIG. 1 cut along the line II—II.
Figure 3:
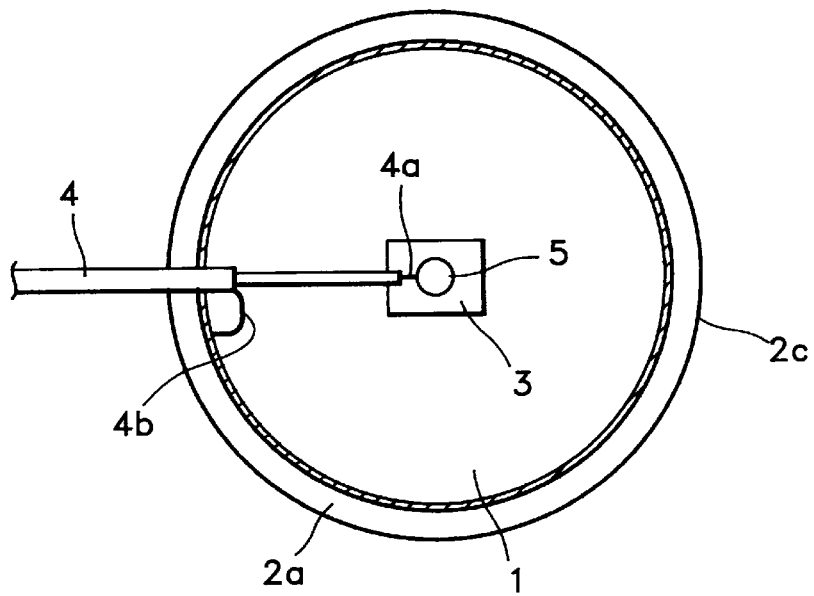
FIG. 3 is a sectional view of the sensor in FIG. 2 cut along the line III—III.
Figure 4:
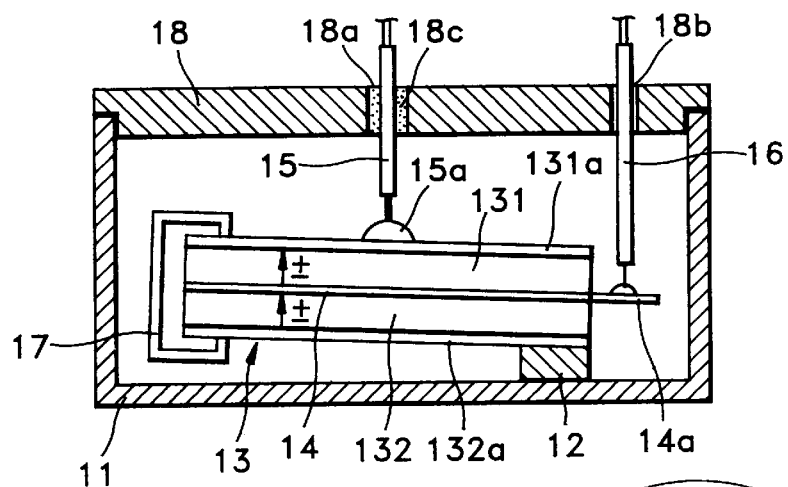
FIG. 4 is a sectional view schematically illustrating a vibration detecting sensor according to an embodiment of the present invention.

Referring to FIG. 4, a vibration detecting sensor according to an embodiment of the present invention is comprised of a cylindrical vibrating case 11 having a wall 11a of a predetermined height, an isolating plate 12 of a predetermined height fixed on the bottom of the vibrating case 11, and a piezo-electric vibrator 13. Here, the isolating plate 12 is composed of $Al_2O_3$ and the piezo-electric vibrator 13 forms a cantilever structure in which one end thereof is fixed to the upper surface of the isolating plate 12. The cantilever structure allows the free end of the piezo-electric vibrator 13 to move in the direction of vibration when a vibration is detected, thereby making precise detection possible.

The piezo-electric vibrator 13 has a bimorphic structure having a first piezo-electric element 131 for detecting vibration and a second piezo-electric element 132 for compensating for temperature changes, which are stacked together by a conductive adhesive. The first and second piezo-electric elements 131 and 132 are polarized in the same direction. A metallic plate 14 is inserted between the piezo-electric elements 131 and 132 to function as a junction electrode. The metallic plate 14 extends past the fixed ends of the piezo-electric elements 131 and 132 forming a projecting portion 14a, which is connected to a ground wire 16. Also, the first and the second piezo-electric elements 131 and 132 are coated with a silver (Ag) paste on the upper and lower surfaces thereof forming first and second electrodes 131a and 132a, respectively. A lead-in wire 15 is soldered to the first electrode 131a by soldering at a soldering portion 15a.

Figure 5:
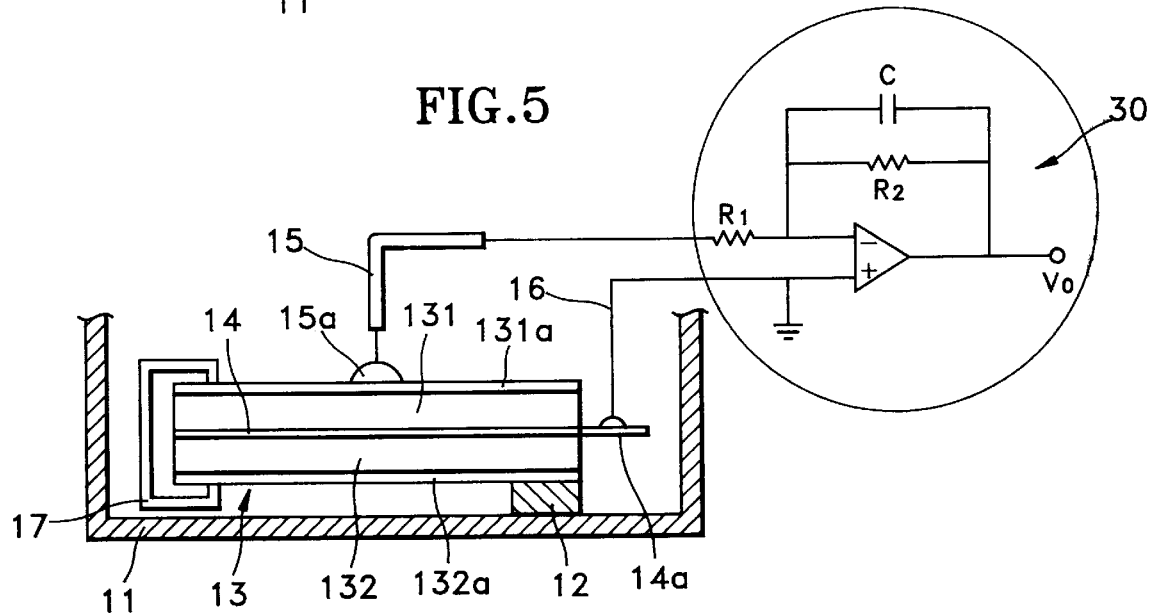
FIG. 5 shows connecting state of lead-in wires of the vibration detecting sensor of FIG. 4.

The lead-in wire 15 and the ground wire 16 are connected to an inverting input terminal and a non-inverting input terminal, respectively, of an operational amplifier (op-amp) 30 as shown in FIG. 5. The first electrode 131a of the first piezo-electric element 131 and the second electrode 132a of the second piezo-electric element 132 are shorted by a channel-shaped copper (Cu) plate 17 disposed on the free side of the piezo-electric vibrator 13. A cover member 18 having holes 18*a* and 18*b* for the lead-in wire 15 and the ground wire 16 to pass therethrough covers the vibrating case 11. Here, the holes are sealed by a glass material.

The vibrating case 11 is composed of a material such as a plastic or rubber having metallic particles distributed therein. And the piezo-electric elements 131 and 132, as in the prior art, are composed of a complex plastic material such as a synthetic resin or a rubber having ferroelectric particles such as PZT or $BaTiO_2$ distributed therein.

Figure 6:
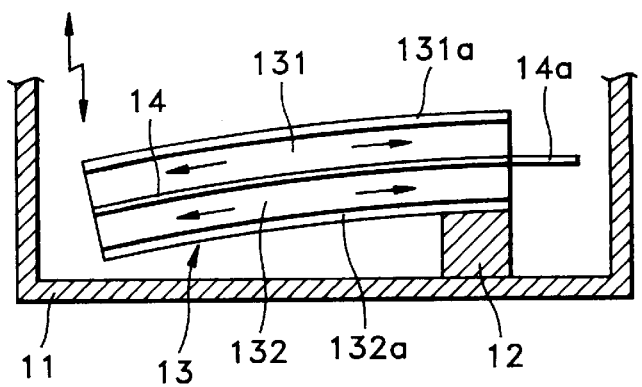
FIG. 6 shows vibration detecting state of the vibration detecting sensor of FIG. 4.

According to the above-described vibration detecting sensor, when the vibrating case 11 detects vibration, the free end of the cantilever-structured piezo-electric vibrator 13 oscillates up and down under the influence of the vibration as shown in FIG. 6. For example, if the vibrating direction is downward, the first piezo-electric element 131 elongates while the second piezo-electric element 132 constricts. Thus, a charge corresponding to the amount of deformation of the piezo-electric elements is generated, and then the generated charge is converted into an electric signal while passing the first electrode 131*a* and metallic plate 14 and then transmitted to the op-amp 30. The first electrode 131*a* of the first piezo-electric element 131 is connected to the inverting input terminal of the op-amp 30 via a resistance R1, and the metal plate 14 is connected to the non-inverting input terminal of the op-amp 30 via the ground wire 16. Therefore, since the input and output of the op-amp 30 are impedance matched, the maximum current is amplified and the output terminal of the op-amp 30 outputs $V_0$ volts. The voltage $V_0$ in the form of an analog signal is converted into a digital square wave signal by a comparator (not shown) and thus the vibrating quantity can be detected.

As described above, a vibration detecting sensor using the temperature compensating piezo-electric element according to an embodiment of the present invention can eliminate the influences of temperature change to its surroundings and thus detection of a pure signal from vibrations can be possible. Moreover, the sensor prevents external noises from penetrating through the casing since the holes for lead-in wires are filled by a glass material.

Such a vibration detecting sensor is not limited to the above-described embodiments but can be modified within the scope of the claims. For example, a vibration detecting sensor according to an embodiment of the present invention can also be effective for detecting low frequency band vibrations from centrifugal forces in a spin cycle of a washing machine.

What is claimed is:

1. A vibration detecting sensor comprising:
   a vibrating case;
   an isolating member attached to said vibrating case;
   a cantilever-structured piezo-electric vibrator, one end of which is supported by said isolating member, the cantilever-structured piezo-electric vibrator comprising a pair of piezo-electric elements.
   electrode layers on the upper and lower surfaces of said piezo-electric vibrator;
   a plate member connecting said electrode layers to act as a short;
   a covering member covering said vibrating case;
   a lead-in wire connected to said piezo-electric vibrator through said covering member; and
   an amplifier connected to said lead-in wire.

2. The vibration detecting sensor as claimed in claim 1, wherein said isolating member is composed of $Al_2O_3$.

3. The vibration detecting sensor as claimed in claim 1, wherein said piezo-electric vibrator has a bimorphic structure in which a first piezo-electric element for detecting vibration and a second piezo-electric element for temperature compensation are stacked.

4. The vibration detecting sensor as claimed in claim 3, wherein said first and second piezo-electric elements are polarized in the same direction.

5. The vibration detecting sensor as claimed in claim 3, wherein a metallic plate acting as a junction electrode is inserted between said first and second piezo-electric elements.

6. A vibration detecting sensor as claimed in claim 5, wherein said metallic plate has a projecting portion projecting from one side of said piezo-electric vibrator and a ground wire is connected to said projecting portion.

7. The vibration detecting sensor as claimed in claim 1 wherein said plate member is composed of copper (Cu).

8. The vibration detecting sensor as claimed in claim 1, wherein said covering member has a hole through which said lead-in wire is inserted, and said hole is sealed with a glass material.

* * * * *